Patented Oct. 25, 1932

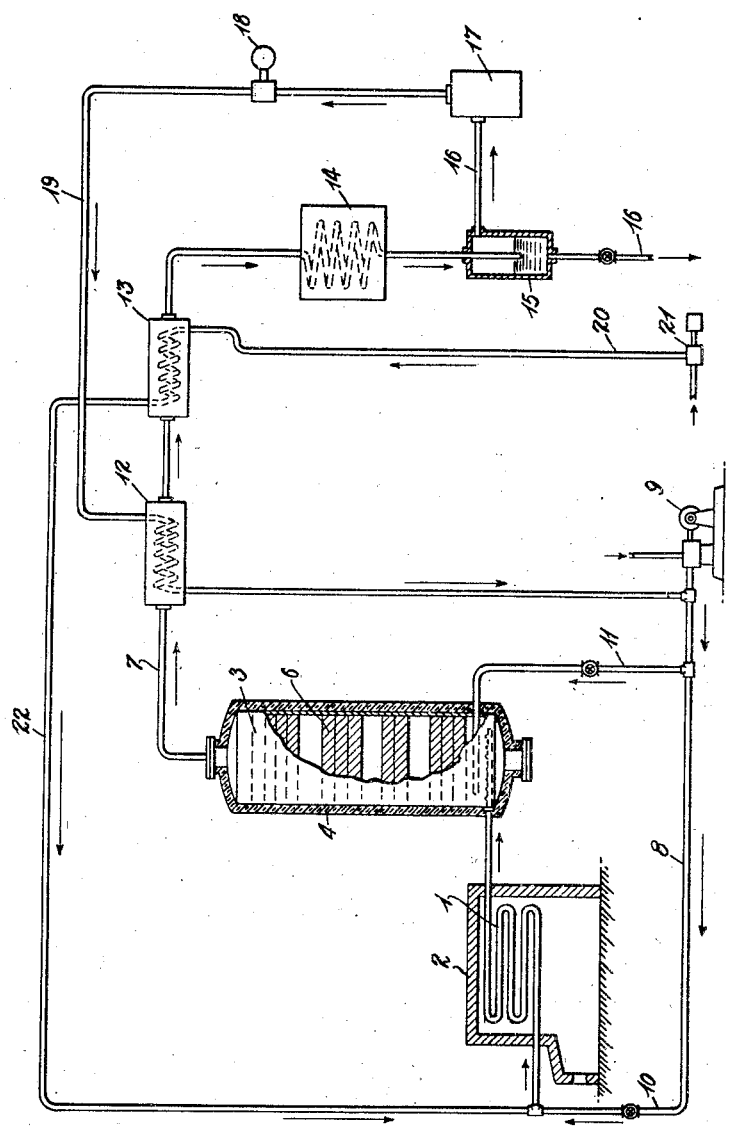

1,884,269

UNITED STATES PATENT OFFICE

ROBERT P. RUSSELL, OF BATON ROUGE, LOUISIANA, ASSIGNOR TO STANDARD-I. G. COMPANY

PROCESS FOR THE MANUFACTURE OF MOTOR FUEL

Application filed August 31, 1929. Serial No. 389,717.

The present invention relates to an improved process for the treatment of light hydrocarbon distillates and more specifically comprises a method for treating natural or cracked gasoline or naphtha distillate with hydrogen under high pressure. My invention will be fully understood from the following description and the drawing which illustrates one form of apparatus constructed according to my invention.

The drawing is a semi-diagrammatic view in sectional elevation of an apparatus for carrying out my process and indicates the flow of materials.

In a co-pending application Serial No. 389,680 filed August 31, 1929, James M. Jennings discloses a process by which light distillate oils may be refined by treatment with hydrogen at temperatures below about 750° F. and under high pressure. In a second application G. H. Davis discloses an improved process for the same general purpose using temperatures above 750° F. and a controlled feed rate whereby the oil is purified without substantial loss. In both of these processes, however, there is a substantial saturation and consequently the oil is not so valuable as an anti-detonating fuel, however much it may be improved in other respects such as color, color hold, sulphur and gum content. In the present invention I have discovered that by suitable adjustment of temperature it is possible to produce a fuel better in respect to knock suppression or anti-detonation characteristics than the untreated oil and at the same time gain those other benefits enumerated above.

Referring to the drawing reference numeral 1 denotes a heating coil arranged in a furnace setting 2 and adapted to heat a rapidly flowing stream of oil and gas to a high temperature. The coil discharges into a reaction chamber 3 which is constructed to withstand temperatures of 500° to 1800° F. and pressures of several hundred atmospheres as well as the corrosive effect of the reactants. The chamber or oven 3 is covered with an insulating layer 4 and may be heated in any suitable manner such as by electrical means (not shown) but generally the heat added in coil 1 is sufficient.

The reaction chamber is packed with a suitable catalytic material 6 to be disclosed below, arranged on trays or grids (not shown) or otherwise supported so that the incoming material passes over or through the catalytic layer before finding exit by line 7.

Hydrogen or a gas rich in free hydrogen is forced under high pressure through a pipe 8 by compressor 9 and thence by branch lines 10 and 11 respectively into the inlet of coil 1 and directly into reactor 3. The outgoing mixture of oil and hydrogen passes by pipe 7 to heat exchangers 12 and 13 and thence to cooler 14 and separation drum 15. The oil is removed from the drum to storage (not shown) by line 16 while gas is separately drawn off to a purification system shown generally at 17 and which may comprise a scrubbing tower in which the gas is scrubbed with oil to remove substantial amounts of hydrogen sulphide and hydrocarbon constituents. Purified hydrogen is recompressed by booster pump 18 and then flows to exchanger 12 and line 8 by line 19. Fresh oil is forced through line 20 by pump 21 to exchanger 13 and thence by line 22 to heating coil 1.

In the operation of my process I have found it desirable to maintain the reactor at a temperature above that at which hydrogenation appears to be most rapid but at such temperatures the hydrogen appears to eliminate gum and sulphur faster than to saturate simple unsaturated or aromatic linkages. In general this temperature is above about 850° F. but I prefer to operate above 900° or even 1000° F. The volume of hydrogen is from 3,000 to 8,000 cubic feet per barrel of oil but may be increased as high temperatures are used, and the pressure is in excess of 20 or 50 atmospheres but preferably at 200 atmospheres or higher and is adjusted in relation to temperature so that the distillate is markedly unsaturated. The actual time of contact varies considerably depending on temperature being very short at high temperatures, say 10 minutes, or less at 900° F., and longer at lower temperature. It is best defined by the character of the product and generally the gas formation is at least 5% by weight of the original oil fractions boiling below 400° F. and the total recovery of liquid is not more than 95% of the volume of the feed. Catalysts such as molybdenum and chromium oxide are used or mixtures of such substances with zinc oxide, aluminum oxide or the like may be used.

While my process may be applied to cracked distillate or natural crude cuts of the boiling range of gasoline, it is desirable to include in the feed higher boiling distillate oil such as boils from 400 to 500° F. or 600° F. or higher for in the treatment a considerable part of this stock is converted so as to boil within the gasoline range. The product is markedly anti-detonating and is much improved in this respect over the gasoline fraction which may be distilled from the feed oil. The sulphur and gum content are much reduced and the color and color holding properties are much improved. The oil should be washed with alkali and may be distilled but no acid treatment is required.

As an example of the operation of my process the following illustration is given:

A distillate derived from cracking Smackover crude has the following characteristics:

| | |
|---|---|
| Gravity | 46.4° A. P. I. |
| Sulphur | .395 per cent |
| Doctor | Did not pass |
| Corrosion | Did not pass |

The light oil distilled to 400° F. end point had the following characteristics:

| | |
|---|---|
| Gravity | 53.9° A. P. I. |
| Sulphur | .169 per cent |

The total cracked distillate is forced through the hydrogenation unit at a rapid rate of flow and treated at about 875° F. and a pressure of about 3000 pounds per square inch. About 88.5% by volume of the oil is recovered as a liquid, the remainder being permanent gas. When the liquid is distilled to 400° F. end point the distillate shows the following characteristics:

| | |
|---|---|
| Gravity | 59.3° A. P. I. |
| Sulphur | .02 per cent |
| Doctor | Passes |
| Copper dish gum | 3 mg. per 100 cc. |

The oil had marked anti-detonating qualities when used as an internal combustion engine fuel.

The anti-detonating qualities of my treated liquid may even be superior to the cracked feed stock if the temperature is sufficiently high, although in general it is desirable to operate at a temperature so that the recovered oil is about equal in anti-detonating qualities to cracked feed stock.

I am aware of the co-opending application Serial No. 389,677 filed August 31, 1929 in the name of Edgar M. Clark, disclosing a process for producing high grade burning oil from kerosene distillate and higher boiling distillate fractions and while that process operates at high partial pressure of hydrogen to secure substantial saturations, my process operates at lower partial pressure of hydrogen at higher temperature in order to make unsaturated, lower boiling oil suitable for motor fuel.

My process is not to be limited to any theory of the mechanism of the process nor to any examples given merely by way of illustration but only by the following claims in which I wish to claim all novelty inherent in the invention.

I claim:

1. An improved process for purifying low-boiling petroleum distillates comprising naphthas and substantially increasing the anti-detonation value thereof, which comprises subjecting the oil to the action of a gas rich in free hydrogen under pressure of at least 20 atmospheres and at a temperature within the range from 850 to about 1000° F., for a time sufficient to convert at least 5% by weight of the original oil boiling below 400° F. to permanent gas, but less than about 10 minutes.

2. An improved process for purifying low-boiling petroleum distillates comprising naphthas and simultaneously increasing the anti-detonation value thereof, which comprises passing the oil with a gas rich in free hydrogen through a reaction zone maintained at a pressure in excess of 20 atmospheres and at temperature between the limits of about 900 and 1000° F., adjusting the rate of flow so that at least 5% by weight of the original oil boiling below 400° F. is converted to permanent gas, but limiting the time of contact to less than 10 minutes.

3. An improved process for purifying low-boiling petroleum distillates comprising naphthas and simultaneously increasing the anti-detonation value thereof, comprising passing the oil with a gas rich in free hydrogen over a sulphur-resistant catalyst maintained at temperature within the limits of 900 to 1000° F., adjusting the rate of flow to convert at least 5% by weight of the oil to permanent gas, but limiting the time of contact at less than 10 minutes.

4. Process according to claim 3 in which the pressure is in excess of 50 atmospheres.

5. Process according to claim 3 in which the pressure is about 200 atmospheres.

ROBERT P. RUSSELL.